United States Patent
Ball et al.

(10) Patent No.: US 7,833,562 B2
(45) Date of Patent: Nov. 16, 2010

(54) EGG PRODUCT WITH PARTICULATES

(75) Inventors: Hershell R. Ball, Salisbury, NC (US);
Kelli Schlagel, Hamburg, MN (US);
Jonathan A. Merkle, Green Isle, MN
(US); Ted A. Kurpgeweit, Wayne, NE
(US)

(73) Assignee: Michael Foods, Inc., Minnetonka, MN (US)

( * ) Notice: Subject to any disclaimer, the term of this patent is extended or adjusted under 35 U.S.C. 154(b) by 386 days.

(21) Appl. No.: 11/560,273

(22) Filed: Nov. 15, 2006

(65) Prior Publication Data

US 2007/0275127 A1    Nov. 29, 2007

Related U.S. Application Data

(60) Provisional application No. 60/737,033, filed on Nov. 15, 2005.

(51) Int. Cl.
    *A23B 5/04*    (2006.01)
(52) U.S. Cl. .................. 426/614; 426/578; 426/568; 426/605; 426/330.1; 426/330
(58) Field of Classification Search .................. 426/568
See application file for complete search history.

(56) References Cited

U.S. PATENT DOCUMENTS

| | | | |
|---|---|---|---|
| 4,882,194 A * | 11/1989 | Rapp | 426/614 |
| 4,910,036 A | 3/1990 | Rapp | |
| 5,741,539 A * | 4/1998 | Knipper et al. | 426/614 |

OTHER PUBLICATIONS

Premier Starch Products Pvt. Ltd., http://www.premierstarch.com/techbulletin.html, Technical Bulletin, accessed Jan. 28, 2009, p. 2.*
Furia, T.E., CRC Handbook of Food Additives, Mar. 2, 1972, $2_{nd}$ Edition, vol. 1, pp. 368-369.*

* cited by examiner

*Primary Examiner*—Jennifer C McNeil
*Assistant Examiner*—Hong Mehta
(74) *Attorney, Agent, or Firm*—Fredrikson & Byron, P.A.

(57) ABSTRACT

A liquid egg product including particulates and the methods of producing the same. The particulates are combined with starch and water or egg whites or egg substitute to form a particulate stream, which is thermally treated prior to combining with an appropriate amount of egg white or egg substitute. The resulting egg product is a ready to cook combination of egg white or egg substitute and particulates that has an extended refrigerated shelf life.

19 Claims, 1 Drawing Sheet

EGG PRODUCT WITH PARTICULATES

CROSS-REFERENCE TO RELATED APPLICATION

This application claims priority to U.S. Provisional Application Ser. No. 60/737,033, filed on Nov. 15, 2005, incorporated by reference herein.

FIELD OF THE INVENTION

The present invention relates generally to egg products containing particulates.

BACKGROUND OF THE INVENTION

Egg whites and egg substitute compositions provide healthy sources of nutrition which are easy for the consumer to prepare. In particular, like whole eggs, they provide high amounts of protein. However, egg whites and egg substitute compositions are typically low in cholesterol and fat, thereby providing a healthy alternative to whole eggs. Egg whites and egg substitute compositions can be provided in a liquid form which is preserved by refrigeration or freezing until cooking, either alone or in combination with other foods.

Consumers frequently desire a final prepared egg white or egg substitute product which includes other food components. An example of such a product is scrambled egg whites or egg substitute including meat, cheese, vegetables or fruits. The addition of other foods to the uncooked egg white or egg substitute prior to delivery of the egg product to the consumer creates a risk of contamination of the egg white or egg substitute by microbes present in the other foods, which may lead to spoilage. One way to avoid this risk is by consumers purchasing the egg white or egg substitute separately from the meat, cheese, vegetable or fruit. Thus the other food items require preparation by the consumer before combining them with the egg whites or egg substitutes at the time of cooking. For example, the other foods may need to be cleaned and cut or broken into appropriate sized pieces to prepare them for cooking with the egg whites or egg substitutes. In addition, the consumer has to control the appropriate proportions of the egg white or egg substitute and other foods to achieve final product with a desirable taste.

One prior art method of providing a mixture of a liquid egg product and vegetables for subsequent preparation of a vegetable omelets is described in U.S. Pat. No. 4,910,036 to Rapp. According to this method, the vegetables for the omelets are combined with a sauce prior to combining with the egg substitute. The sauce is a slurry of starch and water to which a food grade acidulent is added either before or after heating to a temperature of 180 to 240° F. The final sauce has a pH of 2.0 to 3.0. The vegetables are added to the acidic sauce and the vegetable sauce is heated to 120° F., passed through a vacuum, then heated to 200 to 240° F. After cooling and packaging the vegetable sauce, it is ready to combine with a liquid egg product.

The use of acidification and high temperatures can produce undesirable results. For example, in order to achieve a low pH, the food grade acids must be added to the food in amounts which can impact the flavor of the product. For example, acids such as acetic acid, vinegar and lemon juice have strong aromas and flavors which are not always compatible with the desired flavor and aroma of the food product. While the addition of flavors and aromas may in itself be undesirable, it also increases the complexity of the processing and formulation of the egg product. The effect of the acids upon the aroma and taste depends on the particulate content of the egg product, such that different types of particulates accommodate different flavors from the acids. As a result, the formulations must be adjusted, depending on the type of particulates being added, in order to accommodate the flavors and aromas introduced by the acids.

In addition to adding flavors and aromas, the use of acidification limits the selection of particulates and other ingredients. For example, acidification may result in unwanted textural effects upon the particulates. While strong acids may not effect the quality of certain vegetables, it may cause hardening of diced ham pieces. An egg product containing hardened ham pieces would not be satisfactory to the consumer. In addition, the use of acidification limits the types of starches which may be used to those which are acid resistant. It is therefore desirable to produce an egg product containing particulates which avoids the use of high heat and acidification.

SUMMARY OF THE INVENTION

The present invention provides a liquid egg product including particulates and the method of producing the same. The egg product includes a liquid components such as liquid egg whites or egg substitutes in combination with particulates. A few examples of some appropriate particulates that may be used in the egg product of the present invention include, but are not limited to, meat, cheese, vegetables and fruits, alone or in any combination. In many embodiments, the invention of the present application includes formulations and processes to prepare particulate streams that do not require use of either high temperatures (e.g. 180-240°), or acidification of the particulate composition or egg product/particulate composition or combinations of both techniques.

In various embodiments of the present invention, the particulates are combined with either starch and water or with egg white or egg substitute, in a clean environment, to form a particulate stream. In one embodiment, the particulate stream is formed using particulates in starch and water. The particulates are combined with starch and water to form a particulate stream which is thermally processed by heating at a temperature of approximately 160° F. to 170° F. for approximately 8 to 12 minutes. It is then cooled to a temperature of less than approximately 40° F. before combining with the liquid egg white or egg substitute to form the final egg product. The final egg product may be packaged for delivery to consumers.

In another embodiment, the particulate stream is formed using particulates in combination with liquid egg components such as egg white or egg substitute. The particulate stream is thermally processed by heating at a temperature of approximately 138° F. for approximately 8 to 12 minutes. It is then cooled to a temperature of less than approximately 40° F. before combining with the liquid egg component to form the final egg product. The final egg product may be packaged for delivery to consumers.

In another embodiment, the particulate stream formed from particulates and liquid egg component such as egg whites or egg substitute further comprises an anti-microbial preparation. A few examples of suitable anti-microbial agents include, but are not limited to, nisin and nisin containing preparations. These preparations may inhibit the growth of microbes that may survive pasteurization of egg whites or egg substitutes. For example, they may inhibit the growth of microbes such as *Listeria monocytogenes* and spore forming microbes.

Various examples of particulates appropriate for inclusion in the particulate stream according to any of the above embodiments include, but are not limited to, pasteurized meat, pasteurized cheese and dehydrated and frozen vegetables and fruits. The liquid egg component may also be pasteurized before combining with the particulates or the particulate stream. In various embodiments of the present invention, the particulates may comprise up to approximately 50% by weight of the final egg product.

DETAILED DESCRIPTION

Figure 1:
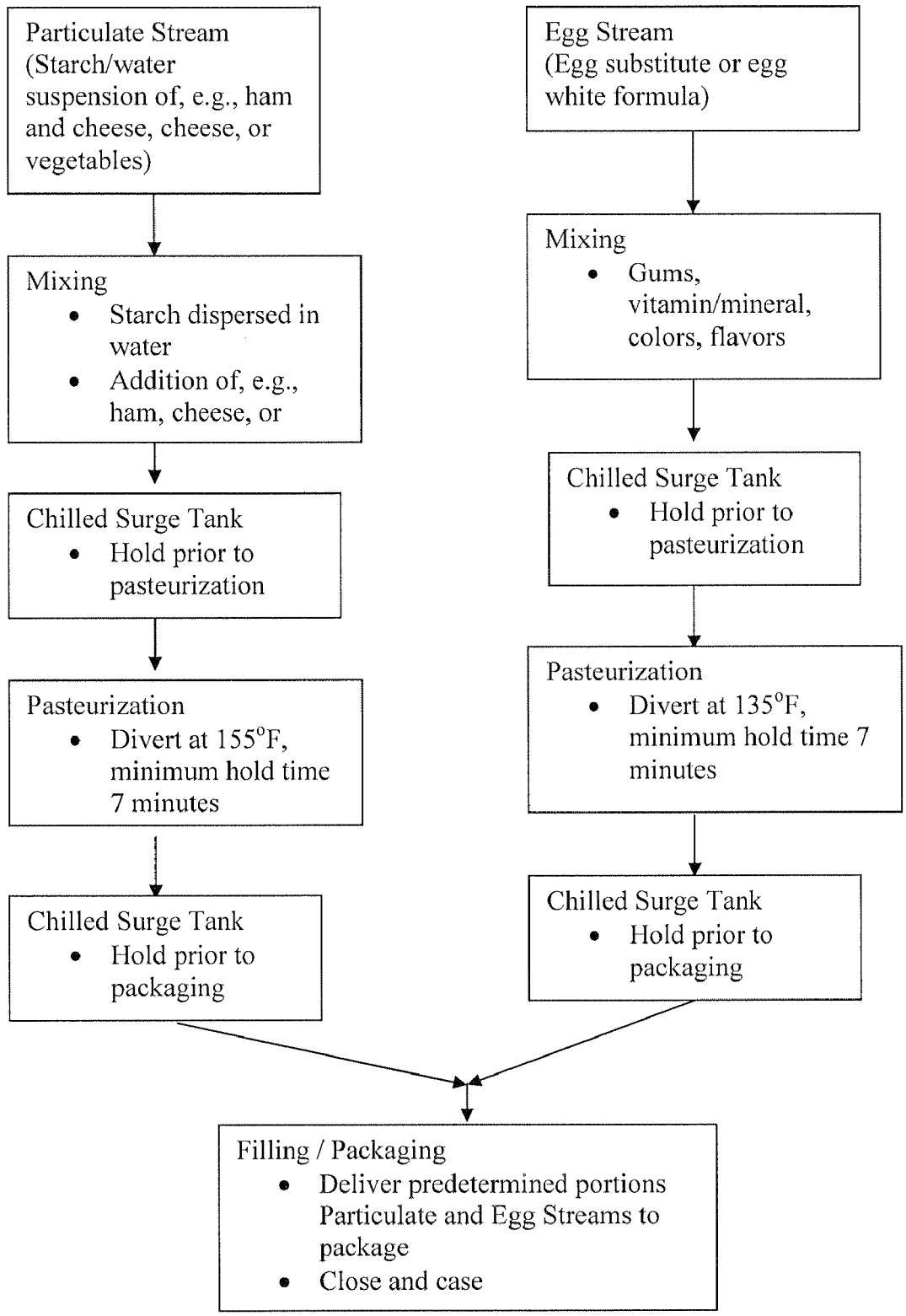
FIG. 1 depicts a block diagram of a method of producing an egg product containing particulates using a starch and water particulate stream.

The present invention relates to liquid egg products containing particulates and the method of manufacturing the same. In many embodiments, the invention of the present application includes formulations and processes to prepare particulate streams that do not require use of either high temperatures (e.g. 180-240°), or acidification of the particulate composition or egg product/particulate composition or combinations of both techniques. Avoiding acidification and high temperatures allows for a wider range of ingredients, retention of desirable textural characteristics, avoidance of flavors and aromas due to the acids, and simpler formulations. The egg product can be packaged for delivery to the consumer as a refrigerated liquid egg product with an extended refrigerated shelf life. The egg product is easy for the consumer to prepare, without the need for separate preparation of the particulates or measuring of the components to achieve a desirable tasting result.

The egg product includes a liquid egg component and a particulate component. The liquid egg component may be egg whites or an egg substitute. Michael Foods, Inc. and other manufacturers currently manufacture and sell formulations of egg substitute and liquid egg whites and any of these or similar formulations are suitable for this invention. In various embodiments of the present invention, the liquid egg component may comprise about 50% to about 95% of the final product. In some embodiments, the liquid egg component comprises about 70-90% of the final product. For example, the liquid egg component may be about 80% of the final product.

The particulate component of this invention may include a single type of particulate or a combination of more than one type of particulate. Examples of particulates appropriate for this invention include, but are not limited to, meats, cheeses, vegetables and fruits. Meat and cheese particulates may be diced or crumbed. Examples of appropriates meats and cheeses include, but are not limited to bacon, sausage, ham and processed cheeses such as white cheddar, colby and jack, although a variety of meats and cheeses would be appropriate for this invention. Similarly, in various embodiments, the fruits and vegetables may be diced. Examples of fruits and vegetables include, but are not limited to, green peppers, red peppers, celery, mushrooms and onions.

Any combination of particulates would be appropriate. Examples of possible combinations include a combination of green and red peppers and onions, a combination of ham and cheese, or a combination of cheddar, colby and jack cheeses. In various embodiments of the present invention, the particulates may comprise up to approximately 50% of the egg product, such as, for example, about 10% to about 40%, with the remainder of the egg product consisting of the egg component and optionally water and/or starch.

In order to decrease the risk of microbial contamination of the egg product, the egg product may be combined with particulate components which are clean, have a low total microbial count, and are free of *Listeria monocytogenes*. The meats and cheeses of the particulate component may be pasteurized prior to combining with other ingredients. The vegetables and fruits may be partially dehydrated and frozen prior to combining.

In some embodiments of the present invention, the particulates may either be combined with starch and water or with egg whites or an egg substitute composition to form the particulate stream. In embodiments using a starch and liquid (e.g. water) slurry, the starch and liquid slurry may contain between approximately 80% and approximately 99% by weight liquid (e.g. water), before combining with the particulates to form the particulate stream. In such embodiments, the combination of starch and liquid then forms the liquid portion of the particulate stream, which includes a liquid portion and a particulate portion. The liquid portion of the particulate stream may contain from about 30% to about 90% of the stream. In some embodiments in contains from about 40-70% liquid portion. For example, the particulate stream may contain approximately 50% liquid portion. The particulate portion of the particulate stream may be from about 10% to about 70% of the particulate stream. In some embodiments, the particulate stream contains approximately 30% to approximately 60% particulates. For example, the particulate stream may contain approximately 50% particulates.

The combining of the particulates with the starch and water or egg white or egg substitute should occur in a clean environment. The resultant particulate stream is then transferred to a chilled storage tank in preparation for thermal processing. By beginning with clean particulate ingredients and by forming the particulate stream in a clean environment, the risk of contamination of the stream, and consequently of the final egg product, with microbes which may cause spoilage is reduced. These precautions also increase the efficiency of the thermal processing steps which follow.

As previously suggested, starches, gums, starch-like plant extracts and materials and combinations of these may be included in the egg product and/or the particulate stream. Examples of starches that may be added include, but are not limited to cereal starch, tuber starch, any other plant starch (such as sago starch, for example), or any combination of any of these in any proportion. Some non-exhaustive examples of suitable cereal starches include corn starch such as instant corn starch, wheat starch, rice starch, oat starch, waxy maize starch such as cook-up waxy maize starch and instant waxy maize starch, sorghum starch, waxy sorghum starch, seed starch and any combination of any of these in any proportion. Some non-exhaustive examples of suitable tuber starches including potato starch, arrowroot starch, tapioca starch, and any combination of these in any proportion. Some non-exhaustive examples of suitable gums include arabic gum, tragacanth gum, karaya gum, ghatti, guar gum such as instant, pre-hydrated guar gum, locust bean gum, xanthan gum, tamarine gum, agar-agar gum, furcellaran gum, gum acacia, and any combination of any of these in any proportion. Some non-exhaustive examples of suitable plant extracts include pectin, arabinogalacton, psyllium, quince seed, alginates, carrageenans, and any combination of these in any proportion. One non-exhaustive suitable example of other starch-like plant materials is cellulose. Alternatively, certain animal materials with starch-like characteristics, such as gelatin, albumin and casein or animal product substitutes, such as soy protein, any combination of any of these in any proportion, and any combination of any of these with any starch and/or gum in any proportion may also be used as the optional stabilizing agent.

Furthermore, other additives may be added to the egg product and/or particulate stream of the present invention. Additives that may be included in the egg product and/or particulate stream include, but are not limited to fat(s), stabilizing agent(s), liquid dairy material(s), flavoring agent(s), coloring agent(s), vitamins, minerals, water, and any combination of any of these in any proportion may optionally be incorporated in the egg product of the present invention.

The thermal processing steps for particulate streams containing starch and water can occur at higher temperatures than the thermal processing step of particulate streams containing eggs. An example of the thermal processing of a particulate stream containing particulates and starch and water is as follows. The particulate stream is thermally processed in a continuous flowing processing system where it is heated to a temperature of approximately 150 to 170° F. and held in that approximate temperature range for about 8 to 12 minutes. The particulate stream is then cooled to a temperature of less than approximately 40° F., for example 25° F. to 35° F. After it is cooled, the particulate is accumulated in a sterile tank. The cooled particulate stream is then delivered into a package where it is combined with an appropriate amount of egg white or egg substitute to form the final product. The use of starch and/or gums builds the viscosity of the suspension of particulates, creating a particulate stream which can be readily dispersed with the liquid egg stream when combined in the final package. Alternatively, the cooked particulate stream is combined with an appropriate amount of egg white or egg substitute prior to packaging. Individual packages are then assembled and further packaged for distribution to consumers as chilled extended shelf life egg white or egg substitute products containing particulates. FIG. 1 diagrammatically represents one embodiment in which an egg product is formed using a particulate stream containing starch and water.

The thermal processing step for particulate streams containing egg white or egg substitute compositions is similar to the thermal processing of particulate streams containing starch and water described above, but it generally occurs at lower temperatures in various embodiments. For example, the particulate stream containing egg white or egg substitute compositions is thermally processed in a continuous flowing processing system where it is heated to a temperature of approximately 130° F. to 140° F., for example approximately 138° F., and held at that approximate temperature for about 8 to 12 minutes. The particulate stream is then cooled to a temperature of less than approximately 40° F., for example approximately 31° F. to 36° F., and accumulated in a sterile surge tank where it is held chilled. The chilled particulate stream is then delivered into a package where it is combined with an appropriate amount of egg white or egg substitute to form the final product. The individual packages may then be assembled for distribution to consumers.

In various embodiments of the present invention, egg products prepared using particulate streams made with egg or egg substitute compositions may also contain anti-microbial preparations. These anti-microbial preparations may be added at any stage in the formation of the egg product. The anti-microbial preparations prevent the growth of microbes, including heat resistant microbes. Examples of appropriate anti-microbial preparations include nisin and nisin containing preparations, such as those supplied by Danisco (Copenhagen, Denmark). The nisin may be provided in combination with, for example, herbal extracts, fatty acids and salts of organic acids. The addition of anti-microbial agents provides an additional barrier against the growth of microbes, including microbes which may survive thermal pasteurization and cause spoilage of the egg product, such as *Listeria monocytogenese* and spore forming microbes such as *Bacillus* sp. and *Clostridium* sp. Nisin and synergistic inhibitors may also improve the efficacy of the pasteurization process. Thus, the thermal treatment of the particulate stream, the selection of clean and pasteurized particulate ingredients, the use of a clean environment, and the addition of anti-microbial preparations function to reduce the risk of microbial contamination of the final egg product. The resultant egg product has an extended refrigerated shelf life without the need for extreme processing steps such as acidification, high temperatures or vacuum conditions.

Because embodiments of this invention are prepared with no or substantially no acidulent, the pH of the particulate stream and of the final product depend on the pH of the ingredients. For example, the particulate stream of the invention may have a pH greater than 4.0. In some embodiments, the pH is greater than 5.0. For example, pH of the particulate stream may be from about 5.5 to about 6.0. The final product, after combining the liquid stream and the particulate stream, may have a pH greater than 7.0. In some embodiments, the pH is greater than about 7.5. For example, the pH of the final product may be between about 7.5 and 9.0.

Processing the egg stream and the particulate stream separately provides several advantages. For example, it allows for better temperature control of the particulate stream. Under some circumstances, the temperature of the particulate stream might be difficult to control, such as when frozen particulates like frozen vegetables are added to the particulate stream. By using a plate heat exchanger and jacketed blending tanks, for example, in the particulate stream blending area, the temperature of the particulate stream can be better controlled. Another benefit of keeping the streams separate is greater flexibility in the processing of the streams. For example, dual processing of the streams allows for the use of different processing parameters for each stream. In this way, the processing of the stream can be adjusted to accommodate ingredients which are sensitive to processing or those which require more rigorous processing. Separately processing the streams also allows for one common egg stream may be utilized with a variety of particulate streams to create a variety of products. In this way, it is possible to switch production from one product to another more quickly. It also allows for greater flexibility in creating kosher products, since the egg stream may be kosher, while the particulate streams to be combined with the egg stream may or may not be kosher, depending on the desired product. In addition, certain products can be produced more efficiently by including ingredients having strong flavors or ingredients which are difficult to remove from the pasteurizer system (such as dark colored spices and finely cut herbs like cinnamon or parsley) in the particulate stream. This prevents prolonged cleaning of the pasteurizer system and the possibility of contamination of future egg product.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations, which fall within the spirit and broad scope of the invention.

EXAMPLE 1

Egg White Formula with Cheese in a Water, Starch, and/or Gum Based Particulate Stream To create 40,000 pounds of egg white stream, the egg white stream is prepared in 10 to 12 batches of 3,500 to 3,800 pounds each using a high shear mixer. To create each 3,500 to 3,800 pound batch, an appropriate amount of raw egg white, approximately 3,700 pounds, is transferred to the high shear mixer. The blender agitator is set at a speed to allow efficient incorporation of the dry ingredients, such as gums, while at the same time minimizing air incorporation.

To facilitate gum hydration, the gum (approximately 6 pounds per batch) and the salt (approximately 2 pounds per batch) are dry blended and added to the egg white mix prior to the addition of other ingredients. Hydrocolloid gums are added to increase the viscosity of the liquid egg white, help suspend the additional added ingredients, and stabilize the finished product.

After the addition of the gum and salt, dried egg whites are added to the batch to build the body and structure of the finished product. Approximately 18 pounds of dried egg whites are slowly added to the batch. The egg white mix is then allowed to continue blending for about 5 more minutes to allow hydration of the dry ingredients. About 15 pounds of a natural liquid cheese flavor is then added to the batch, followed by two natural cheese flavor pastes in an amount equaling approximately 18 pounds per batch. Finally, approximately 2 pounds of monoglycerides and diglycerides are added as emulsifiers.

The liquid egg white mixture is allowed to continue blending until it has a smooth, even consistency. The pH of the egg white mixture is then tested and adjusted to a pH of 8.4 to 9.0 using 1.1 Normal sodium hydroxide.

The 3,500 to 3,800 pound batch of liquid egg white mixture is transferred to a 20,000 gallon raw egg storage silo for holding until thermal processing. Each successive batch is mixed following the procedure described above and is then added to the egg white mixture in the raw silo. Gentle agitation within the raw storage silo is used to ensure homogeneity of the completed 40,000 lb batch prior to thermal processing.

The egg white mixture is processed at 138° F. for approximately 8 to 12 minutes. It is then cooled to a temperature of less than 40° F. The processed egg white mix is held in a 15,000 gallon sterile tank until product filling.

The particulate stream, water, and/or starch, and gum based particulate stream with white cheddar cheese, is prepared in batches of approximately 3,300 to 3,500 pounds using a high shear mixer. First, the water, starch and gum mix is prepared. Approximately 3,300-3,500 lbs of water is transferred into a high shear mixer. The blender speed is set at a speed to allow efficient dispersion and hydration of the dry ingredients such as a cold water swelling starch, and/or a blend of guar and xanthan gums. First, the gum is added slowly added, followed by the starch. This mixture is allowed to agitate until no visible lumps of gum or starch remain. The starch and/or gums are added to significantly increase the viscosity of the water and aid in suspending the solid cheese particulates throughout the transfer and processing of the particulate stream. Once the mixing of the water, starch, and gum is complete, approximately 1,600 to 1,700 pounds of the mixture is transferred into one particulate stream blending tanks and the other 1,600 to 1,700 pounds of the mixture is transferred into a second particular stream blending tank.

Approximately 1,600 to 1,700 pound of pasteurized, processed, diced white cheddar cheese is then transferred to each of the two particulate stream blending tanks. Gentle agitation is used to evenly suspend the solid particulate cheese pieces throughout the liquid. Upon completion of mixing, each water based particulate stream with cheese is transferred to a 1,000 gallon, chilled, raw surge tank until thermal processing.

The water, starch, and/or gum based cheese particulate stream is processed at temperature of 160° F. to 170° F. for 8 to 12 minutes. It is then cooled to a temperature of less than 40° F. The processed water, starch, and/or gum based cheese particulate stream is held in a 3,000 gallon, chilled sterile tank until product filling.

Portions of the egg white stream and the water, starch and/or gum based cheese particulate stream are combined in the desired proportions to create the final product. The liquid egg white based stream may comprise from about 50 to about 95% of the final carton fill weight and the water, starch, and/or gum based cheese particulate stream may comprise from about 5% to about 50% of the final carton fill weight.

EXAMPLE 2

Egg Substitute with Ham & Cheese in an Egg Substitute Based Particulate Stream

To create 40,000 pounds of egg stream, the egg stream is prepared in 10 to 12 batches of 3,500 pounds each using a high shear mixer. To create each 3,500 to 3,800 pound batch, an appropriate amount of raw egg white, approximately 3,700 pounds, is transferred to the high shear mixer. The blender agitator is set at a speed to allow efficient incorporation of the dry ingredients, such as gums, while at the same time minimizing air incorporation.

To facilitate gum hydration, the gum (approximately 10 pounds per batch) is added to the egg white mix prior to the addition of other ingredients. Hydrocolloid gums are added to increase the viscosity of the liquid egg white, help suspend the additional added ingredients, and stabilize the finished product.

Following the addition of the gum, approximately 2 pounds of salt, approximately 3 pounds of spices and approximately 2 pounds of a vitamin and mineral premix are dry blended. They are then added to the egg substitute mix. Next approximately 37 pounds of dried egg whites are added and allowed to mix for about 3 to 5 minutes to aid in hydration. The dried egg whites are added to build body and structure in the finished product. Following the dried egg whites, modified food starch is added and allowed to mix for about 3 to 5 minutes to aid in hydration. The blender speed is then reduced and the egg substitute mix is allowed to mix for about 15 minutes to allow additional time for dry ingredient hydration.

Prior to the addition of the remaining ingredients, the agitator speed is increased again to allow efficient ingredient dispersion while minimizing air incorporation. Approximately 25 pounds of calcium sulfate is added to the egg substitute mix, followed by approximately 0.5 pounds of liquid beta carotene for coloring, approximately 1 pound of annatto coloring, and approximately 13 pounds of liquid natural egg flavor. Dry titanium dioxide is blended with water at a ratio of 1:2 and added to the mix.

Following the liquid ingredient addition, approximately 100 pounds of natural cheese flavor pastes are added liquid egg substitute mix. The cheese flavors are followed by the addition of approximately 2 pounds of monoglycerides and diglycerides as emulsifiers.

The liquid egg substitute is allowed to continue blending until it has a smooth, even consistency. The pH of the mix is then tested and adjusted to a pH of about 8.4 to about 9.0 using 1.1 normal sodium hydroxide.

The 3,500-3,800 pound batch of liquid egg substitute mix is then transferred to a 20,000 gallon raw egg storage silo for holding until thermal processing. Each successive batch is mixed following the procedure described above and is then added to the blended egg substitute mix in the raw silo. Gentle agitation within the raw storage silo is used to ensure homogeneity of the completed 40,000 pound batch prior to thermal processing.

The egg substitute mix is processed at a temperature of 138° F. for approximately 8 to 12 minutes. It is then cooled to a temperature of less than 40° F. The processed egg substitute mix is held in a 15,000 gallon liquid egg sterile tank until product filling.

The processed egg substitute as described above is used as the egg substitute portion of the particulate stream. Approximately 3,300 to 3,500 pounds of the processed egg substitute is transferred from the 15,000 gallon liquid egg sterile tank to a high shear mixer to create individual batches of the particulate stream.

One or more antimicrobial agents consisting of nisin or a nisin preparation is added to the egg substitute batch in an amount to achieve a desired end product level of 0.05-0.3%. The amount of antimicrobial agent added therefore depends upon the particulate stream fill weight in the final package. After addition of the antimicrobial agent or agents, the egg substitute mix is divided into two portions of approximately 1,600 to 1,700 pounds and each portion is transferred into a separate particulate stream blending tank. If in other embodiments antimicrobial agents are not included, the processed egg substitute is transferred directly from the 15,000 gallon liquid egg sterile tank to one of two particulate stream blending tanks.

Approximately 1100 pounds of pasteurized, processed, diced cheddar cheese and approximately 530 pounds of pasteurized, diced ham are transferred to each of the two particulate stream blending tanks containing the egg substitute stream. Gentle agitation is used to evenly distribute the solid particulate cheese and ham pieces throughout the liquid. Once the mixing is complete, the egg substitute particulate stream with cheese and ham is transferred to a 1,000 gallon, chilled, raw surge tank until thermal processing.

The egg substitute based particulate stream is processed at a temperature of 138 to 142° F. for 8 to 12 minutes. The particulate stream is then cooled to a temperature of less than 40° F. The processed egg substitute particulate stream is then held in a 3,000 gallon, chilled sterile tank until product filling.

Portions of the egg substitute stream and the egg substitute based particulate stream are combined in the desired proportions to create the final product. The liquid egg substitute stream may comprise about 50 to about 95% of the final carton fill weight. The egg substitute based particulate stream (with or with out one or more antimicrobial agents) containing cheese and ham may comprise about 5 to about 50% of the final carton weight.

EXAMPLE 3

Egg Substitute with Vegetables in a Water, Starch and/or Gum Based Particulate Stream To create 40,000 pounds of egg stream, the egg stream is prepared in 10 to 12 batches of 3,500 pounds each using a high shear mixer. To create each 3,500 to 3,800 pound batch, an appropriate amount of raw egg white, approximately 3,700 pounds, is transferred to the high shear mixer. The blender agitator is set at a speed to allow efficient incorporation of the dry ingredients, such as gums, while at the same time minimizing air incorporation.

To facilitate gum hydration, the gum (approximately 10 pounds per batch) is added to the egg white mix prior to the addition of other ingredients. Gums are added to increase the viscosity of the liquid egg white, help suspend the additional added ingredients, and stabilize the finished product.

Following addition of the gum, approximately 15 pounds of salt, approximately 7 pounds of spices and approximately 2 pounds of a vitamin and mineral premix are dry blended and added to the egg substitute mix. Modified food starch is then added and allowed to mix for 3 to 5 minutes to aid in hydration. Approximately 5 pounds of calcium sulfate is then added.

Next, approximately 3 pounds of liquid beta carotene for coloring, approximately 3 pounds of titanium dioxide blended with water in a ratio of 1:2, approximately 15 pounds of natural egg flavor, and approximately 6 pounds of liquid spice oleoresins are added to the egg substitute mixture.

The egg substitute mixture is allowed to continue blending until it has a smooth, even consistency. The pH of the mix is tested and adjusted to a pH of 8.8 to 9.2 using 1.1 normal sodium hydroxide.

The 3,500 to 3,800 pound batch of liquid egg substitute mix is then transferred to a 20,000 gallon raw egg storage silo for holding until thermal processing. Each successive batch is mixed following the procedure described above and then added to the blended egg substitute mix in the raw silo. Gentle agitation within the raw storage silo is used to ensure homogeneity of the completed 40,000 pound batch prior to thermal processing.

The egg substitute mix is processed at a temperature of 138° F. for approximately 8 to 12 minutes. It is then cooled to a temperature of less than 40° F. The processed egg substitute mix is then held in a 15,000 gallon liquid egg sterile tank until product filling.

The water, starch and gum based liquid stream is blended in batches of 3,300 to 3,500 pounds using a high shear mixer. Approximately 3,300 to 3,500 pounds of water is transferred into a high shear mixer. The blender is set at a speed to allow efficient dispersion and hydration of the dry ingredients such as a cold water swelling starch, and/or a blend of guar and xanthan gums.

First the gums are added slowly, followed by the starch. The mixture is allowed to agitate until no visible lumps of gum or starch remain. The starch and/or gums are added to significantly increase the viscosity of the water and aid in suspending the solid vegetable particulates throughout the transfer and processing of the vegetable containing particulate stream.

To improve the ease in working with frozen vegetable pieces, the water, starch and gum based liquid stream may be passed through a plate heat exchanger to increase the temperature of the slurry to about 140° F. Heating of the liquid allows for more rapid thawing of the frozen vegetables, improving the ease of mixing.

The water, starch and/or gum liquid stream is divided into two portions of about 1,600-1,700 pounds and the two portions are transferred into two particulate stream blending tanks. Approximately 575 pounds of frozen, diced red peppers, approximately 575 pounds of frozen, diced green peppers, approximately 360 pounds of frozen, diced onions, approximately 165 pounds of frozen, diced chili peppers, and approximately 1 pound of dried, chopped cilantro are then added to each particulate stream. The particulate stream blending tanks are jacketed tanks which allow additional heat transfer to further aid in thawing of the vegetables. Gentle agitation is used to evenly suspend the solid particulate vegetable pieces throughout the liquid.

Upon completion of mixing, the water based particulate stream with vegetables is transferred to a 1,000 gallon, chilled, raw surge tank until thermal processing. The water, starch, and/or gum based vegetable particulate stream is processed at a temperature of 160° F. to 170° F. for 8 to 12 minutes. It is then cooled to a temperature of less than 40° F. The processed water, starch, and/or gum based vegetable particulate stream is held in a 3,000 gallon, chilled sterile tank until product filling.

Portions of the egg substitute stream and the water, starch and/or gum based particulate stream are separately added to the packages in the desired proportions. The liquid egg substitute stream can comprise about 50% to about 95% of the final carton fill weight. The water, starch and/or gum based vegetable particulate stream can comprise about 5% to about 50% of the final carton weight.

What is claimed is:

1. A method of producing a liquid egg product containing particulates comprising:
   combining particulates with starch and water in a clean environment, the particulates comprising meat, cheese, vegetable and/or fruit, to form a particulate stream;
   heating the particulate stream and maintaining a temperature of approximately 150° F. to 170° F. for approximately 8 to 12 minutes;
   cooling the particulate stream to a temperature of less than approximately 40° F.; and
   combining the cooled particulate stream with liquid egg white or liquid egg substitute.

2. The method of claim 1 further comprising packaging the combination of particulate stream and egg white or egg substitute.

3. The method of claim 1 wherein the meat and/or cheese is pasteurized prior to combining with starch and water to form the particulate stream.

4. The method of claim 1 wherein the vegetable and/or fruit is partially dehydrated and frozen prior to combining with starch and water to form the particulate stream.

5. The method of claim 1 wherein the particulates comprise up to approximately 50% by weight of the egg product.

6. The method of claim 1 wherein the water and starch are combined and thermally processed prior to combining with the particulates.

7. A liquid egg product produced according to the method of claim 1.

8. A method of producing a liquid egg product containing particulates comprising:
   combining particulates with egg white or egg substitute in a clean environment, the particulates comprising meat, cheese, vegetable and/or fruit, to form a particulate stream;
   heating the particulate stream and maintaining a temperature of approximately 130° F. to 140° F. for approximately 8 to 12 minutes;
   cooling the particulate stream to a temperature of less than approximately 40° F.; and
   combining the cooled particulate stream with additional liquid egg white or liquid egg substitute.

9. The method of claim 8 further comprising packaging the combination of particulate stream and additional egg white or egg substitute.

10. The method of claim 8 wherein the meat and/or cheese is pasteurized prior to combining with egg white or egg substitute to form the particulate stream.

11. The method of claim 8 wherein the vegetable and/or fruit is partially dehydrated and frozen prior to combining with egg white or egg substitute to form the particulate stream.

12. The method of claim 8 wherein the particulates comprise up to approximately 50% by weight of the egg product.

13. The method of claim 8 wherein the egg white or egg substitute is pasteurized prior to combining with the particulates or the particulate stream.

14. The method of claim 8 further comprising combining the particulates, the particulate stream, or the egg white or egg substitute with an anti-microbial preparation.

15. The method of claim 14 wherein the anti-microbial preparation is nisin or a nisin-containing preparation.

16. The method of claim 14 wherein the anti-microbial preparation inhibits the growth of microbes that may survive pasteurization of egg whites or egg substitutes.

17. The method of claim 16 wherein the microbe is *Listeria monocytogenes* or a spore-forming microbe.

18. A liquid egg product produced according to the method of claim 8.

19. The method of claim 8, wherein the particulate stream is heated and maintained at a temperature of approximately 138° F.

* * * * *